United States Patent [19]
Budd et al.

[11] 3,776,023
[45] Dec. 4, 1973

[54] CALIBRATION SYSTEM FOR GAS ANALYZERS
[75] Inventors: Allan L. Budd, San Diego, Calif.; Paul E. Wilkens, Fairfax, Va.
[73] Assignee: Monitor Labs Inc., San Diego, Calif.
[22] Filed: Dec. 22, 1971
[21] Appl. No.: 210,936

[52] U.S. Cl. .................................................. 73/1 R
[51] Int. Cl. ............................................ G01n 31/00
[58] Field of Search .................................... 73/1 R

[56] References Cited
UNITED STATES PATENTS
3,611,790  10/1971  Brouwer ............................. 73/1 R
3,242,715  3/1966   Hubner .............................. 73/1 R
3,618,911  11/1971  Martin ............................... 73/1 R OTHER PUBLICATIONS
"Hedlin in Materials Research & Standards" January 1966 pages 25 to 29.

Primary Examiner—S. Clement Swisher
Attorney—Paul M. Cohen et al.

[57] ABSTRACT
Purified air is mixed with a source gas generated by a permeation tube to form a mixture of precise concentration. The mixture is used for calibrating a gas analyzer. Solenoid actuated valves selectively furnish the analyzer with either one gas, or a plurality of gases simultaneously. Means within the invention system maintain the gases delivered to an analyzer at constant humidity and temperature to insure reproducibility of calibration results.

11 Claims, 3 Drawing Figures

CALIBRATION SYSTEM FOR GAS ANALYZERS

BACKGROUND OF THE INVENTION

The present invention relates to a calibration system for gas analyzers, and more particularly to a calibration system incorporating a permeation tube that introduces a source gas into a purified air stream to form a diluted calibrating source gas mixture of precise concentration.

BRIEF DESCRIPTION OF THE PRIOR ART

With increased governmental and public interest in air pollution, research and development of gas analyzers has been spurred. In order for these analyzers to measure accurately, it is necessary to periodically calibrate the analyzer instrument.

The prior art has made available calibration systems in which ambient air is pumped through a scrubber to remove contaminants. The resulting purified gas is referred to as zero gas which is then flow controlled and metered to permeation tubes located in a temperature bath. The permeation tubes introduce a preselected source gas (pollutant) into the zero gas stream thereby forming a "polluted" source gas mixture of precise concentration that is used to calibrate a gas analyzer.

Certain prior art calibrating systems include delivery capability of a single, or a plurality of source gases simultaneously. However, the selection must be manually made from the front panel controls. Therefore, such prior systems do not have the capacity for automatic switching by remote control. This remote control is desirable inasmuch as gas analyzers themselves are frequently located at an unmanned monitoring station from which gas analyzer data is transmitted to an acquisition station.

Prior calibration systems generally lack precise reproducibility of calibration results because the humidity in a system varies with the relative humidity of the ambient air as delivered to the calibration system. A variation in humidity will effect the performance of a penetration tube.

Because a permeation tube is extremely responsive to temperature changes, it is imperative that the permeation tube be maintained at a precisely controlled constant temperature. This feature has been somewhat lacking in prior systems. As a result, reproducibility of calibration results is jeopardized.

A further error factor introduced by existing systems occurs when the system is shut down. Because a permeation tube continues to permeate source gas, there can be a buildup of such gas in the system. Accordingly, when the system is next turned on, the initially delivered source gas will have a misleading high concentration.

Still another problem with previous systems is their inability to purify ambient air of certain gaseous substances, such as nitrogen oxide (NO). Because gas analyzers frequently measure the air pollutant nitrogen dioxide ($NO_2$), this measurement will be wrongly effected by the nitrogen oxide.

BRIEF DESCRIPTION OF THE INVENTION

The present invention is a decided improvement over prior art calibration systems.

Solenoid valves are provided to permit delivery of either one or a plurality of source gases simultaneously. An automatic timer is programmed to switch between zero gas and source gas thereby permitting multiple point calibration of a connected gas analyzer.

Remote control means permits the initiation of this switching function from a point distant from the calibration system. This allows regular calibration of gas analyzers at an unmanned monitoring station.

The present system offers precise reproducibility of calibration results due to the inclusion of a conditioner in the path of introduced ambient air. This conditioner maintains a steady state moisture content that regulates the humidity of the air stream passing through the conditioner. Further, by means of precise temperature control of zero gas by a temperature bath surrounding a permeation tube, the temperature factor is kept precisely contstant thereby insuring repeatable flow rates from the permeation tube.

Inclusion of a conditioner where mentioned also transforms certain gaseous mixtures, such as nitrogen oxide, to highly oxidized states where they can be easily filtered by a charcoal filter. By such effective filtration, the system will be provided with highly purified zero gas.

To prevent the buildup of permeated source gas during system shutoff, the system is bled at a low flow level thereby flushing the system from such buildup, which would otherwise produce a high concentration source gas when system operation is again initiated.

As an additional feature of the present invention, an ultraviolet ozone generator is provided which can deliver a preselected concentration of ozone to a connected gas analyzer.

By virtue of the present system's construction, an entire calibration unit can be made portable and compact. Accordingly, as will be appreciated, the features of the present invention offer a user greater flexibility in calibrating gas analyzers.

The above-mentioned objects and advantages of the present invention will be more clearly understood when considered in conjunction with the accompanying drawings, in which.

Figure 1:
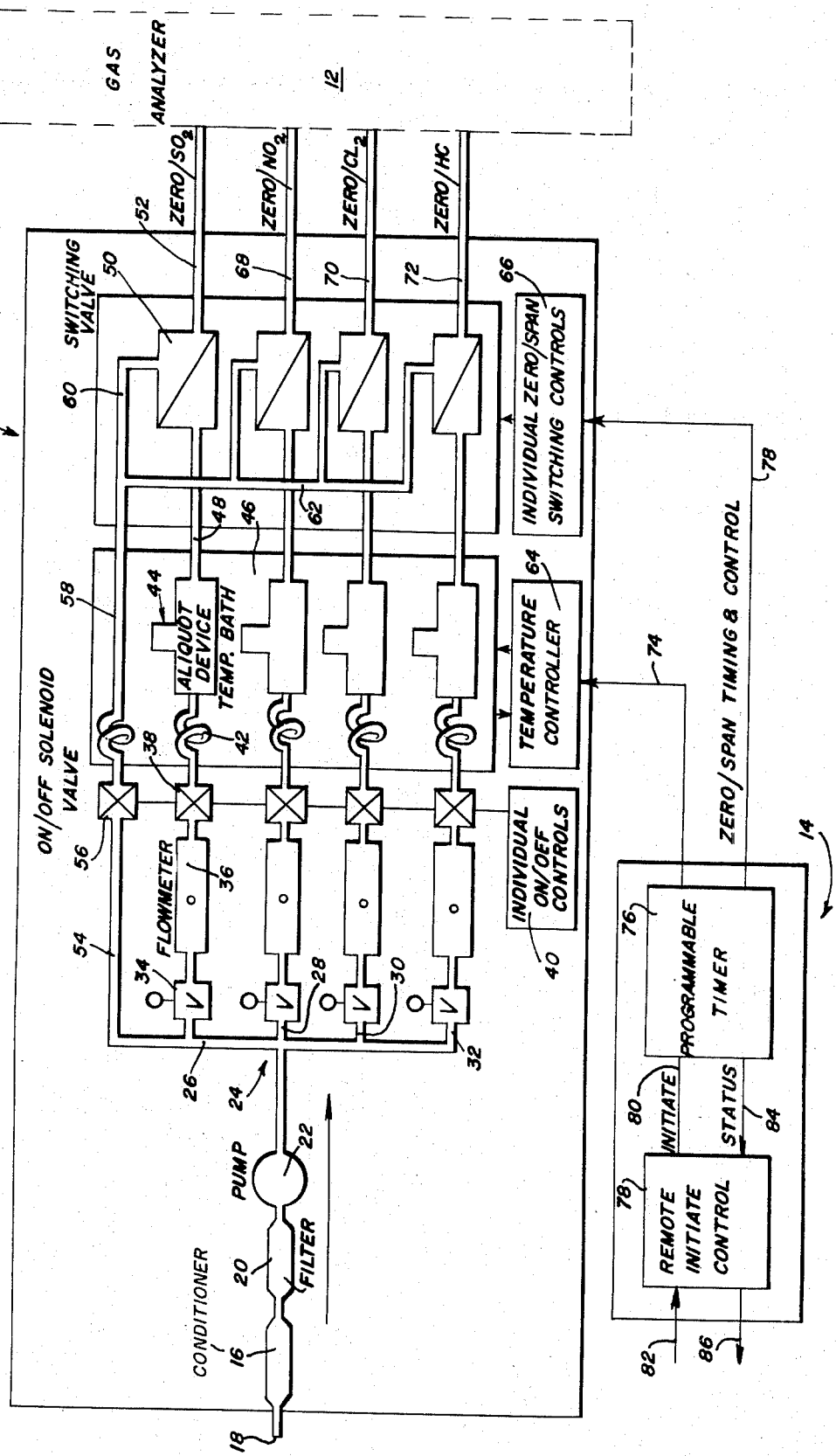
FIG. 1 is a functional diagram of the overall calibration system.

Referring to the figures and more particularly FIG. 1 thereof, reference numeral 10 generally denotes the calibration system of the present invention, which is capable of being housed in a single portable and rugged unit. The purpose of the calibration system 10 is to allow precise calibration of a separate gas analyzer 12 which does not, per se, form a part of the present invention. The calibration system 10 can supply the gas analyzer 12 with either one or several different source gases.

As will be explained hereinafter, operation of the system 10 can be controlled by actuating appropriate controls forming a part of the system unit. Also, automatic control of the system can take place remotely by remote control means 14, to be dealt with in detail hereinafter.

A conditioner 16 conditions ambient air introduced at inlet port 18. After a short period of operation, the conditioner absorbs moisture from the ambient air and thereafter regulates the humidity of the air stream passing out from the conditioner. By maintaining the conditioned air at a constant humidity, the reproducibility of calibration results becomes extremely good. Further, the conditioner 16 elevates the oxidation state of certain gases, for example, nitrogen oxide, which would otherwise go unfiltered by a following charcoal filter 20. The moisture absorbing character of the charcoal filter is similar to that discussed in reference to conditioner 16. Thus, between the conditioner 16 and the charcoal filter 20, humidity regulation for the system is excellent.

A pump 22 is connected at the outlet of the filter 20. Because the pump 22 is connected after the conditioner and filter, it receives a clean supply of air (zero gas) which enhances the raliability and low maintenance requirement of the pump 22.

The zero gas is divided along parallel paths, each path being a diluent inlet for a different source gas. Junction point 24 extends to parallel branches indicated by reference numerals 26, 28, 30 and 32. Each of these branches evolves as a supply of a different source gas. However, for convenience, only the branch 26 will be discussed although the other branches contain components of identical structure to that of branch 26.

A flow valve 34 operates upon the zero gas delivered from junction point 24. The flow valve serves to dampen air pulsations generated by the pump 22. A flow meter or rotometer 36 is serially connected to the outlet of flow valve 34. The flow meter 36 permits variations in flow rate of zero gas through the branch 26. The flow meter 36 and pump 22 furnish the system with means for varying the concentration of zero source gas delivered by the system. This in turn permits multiple point calibration of a gas analyzer 12. Each branch 26 can be opened or shut off by an electrically controlled solenoid valve 38 which is electrically controlled by individual on/off switches 40 that are made accessible to an operator. When the solenoid valve 38 is turned on, zero gas passes therethrough and is introduced to Aliquot device 44. The zero gas is a diluent which dilutes the source gas to a precise concentration. As will be discussed in connection with FIG. 2, the source gas is directly generated from a permeation tube that forms a part of the Aliquot device 44.

As indicated in FIG. 1, a pre-heater coil 42 is disposed between the solenoid valve 38 and the Aliquot device 44. This coil is positioned, along with the Aliquot device, within a temperature bath 46 that is maintained at a precise temperature by a thermostat or other precision temperature controller 64. The temperature bath 46 is a chamber filled with heated air maintained at a precise temperature. The pre-heater 42 insures that the zero gas temperature is equalized to that of the permeation tube. This consideration is important because the permeation tube flow rate is extremely temperature sensitive. By equalizing the temperature, the permeation tube remains unaffected by the temperature of incoming zero gas. By maintaining the entire Aliquot device 44 at a precisely constant temperature, the reproducibility of calibration results is greatly enhanced.

The outlet 48 of the Aliquot device 44 communicates with the inlet of a switching valve 50. Such a valve can be solenoid actuated to allow direct passage of the diluted source gas from 48 to the system outlet 52. However, a second state of the valve 50 permits delivery at the outlet 52 of zero gas alone. This is accomplished through a zero gas jumper branch 54 which has its inlet end connected to junction point 24. The branch includes a serially connected solenoid valve 56, identical in structure and operation to the solenoid valve 38 previously discussed. The conduit 58 delivers zero gas from the solenoid valve to a second inlet 60 of the switching valve 50. Similarly, parallel conduit 62 connects the zero gas jumper to the switching valves associated with the source gas branches 28, 30 and 32.

Switching controls 66, which may be double throw switches, allow the operator to select which gas is to be delivered to the system outlet 52. Thus, if zero gas is to be first introduced to gas analyzer 12, an individual switching control 66 operates the solenoid valve 50 in such a manner as to complete a conduit path between junction 24 and outlet 52. Of couse, the solenoid valve 66 must be turned on by actuation of its individual control 40 before gas will pass therethrough. The temperature controller 64 can be a precision thermostat.

When the source gas associated with branch 26, for example sulfur dioxide, is to be supplied to gas analyzer 12, the switching valve 50 is repositioned to permit communication between outlet port 48 of the Aliquot device 44 and the system outlet 52.

When the system is delivering zero gas, it is said to be in the zero mode. When source gas is being delivered, the system is said to be in the span mode. The zero-span mode capabilities are indicated on FIG. 1 for the following gases: $SO_2$ at outlet 52; $NO_2$ at outlet 68; $Cl_2$ at outlet 70 and HC at outlet 72. Choice of four gases as specified is only exemplary.

To change the concentration of source gas several alternatives are possible. First, the pumping rate of pump 22 can be varied to introduce more or less zero gas into the system per second. Second, adjustments of flow meter 36 will vary the flow rate therethrough and thereby effect the concentration of source gas at outlet 52. Third, inasmuch as the permeation tube contained in the Aliquot device 44 is extremely temperature sensitive, by varying the temperature controller 64, the concentration of source gas can be varied. It should be mentioned at this point, that when the system is operating in a stand-by mode, sufficient bleeding flow is assumed to prevent the buildup of permeated source gas in the Aliquot device 44. If the source gas was permitted to build up, the next time the source gas was to be delivered in quantity, the initial moments of source gas delivery would contain a misleading high source gas concentration.

Oftentimes, a gas analyzer will be located at an unmanned monitoring station. Usually, such a gas analyzer is connected in a date communications network with an acquisition station. Accordingly, for effective calibration to take place, it must be done automatically. This is accomplished by the remote control assembly generally indicated by reference numeral 14. The assembly includes a temperature controller command link 74 that carries on/off command signals from a programmable timer 76. This timer may be of the conventional type incorporating motorized trip switches that open and close at preselected intervals. A second output for the programmable timer 76 is indicated by link 78 that provides zero/span timing control commands to the switching controls 66 located in the system 10. The programmable timer can be actuatable by a remote initiate control 78 which may, for example, be a radio transmitter that transmits an initiate signal 80 received by a radio receiver in the front end of the programmable timer 76. Line 82 indicates the initiating start signal for actuating the remote initiate control 78. Detecting means for sensing the switch closures in the programmable timer 76 can provide status information regarding the timer. Status data 84 from the programmable timer 76 can be transmitted by means of radio communication to a receiver at the remote initiate control 78 which then decodes the transmitted data and makes it available on a print out or display such as an oscilloscope. The final status readout is represented at line 86.

Figure 2:
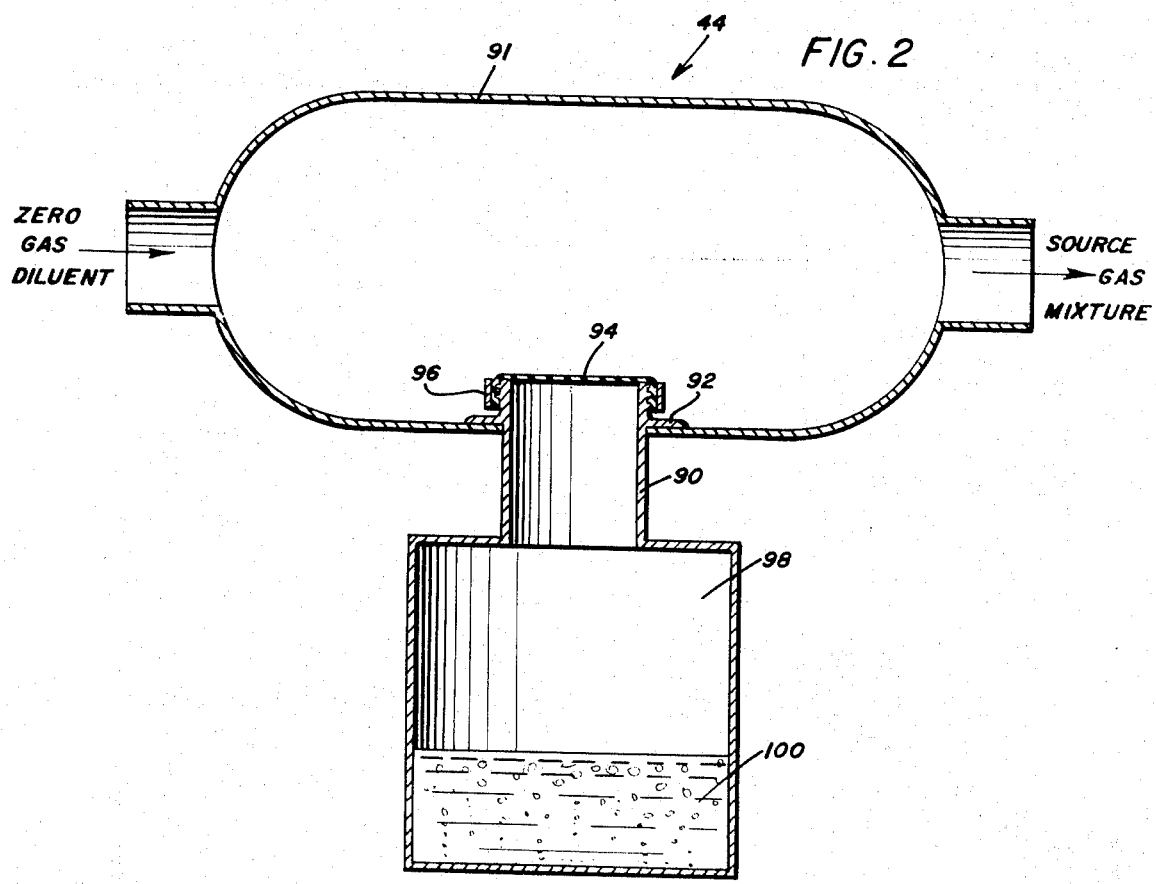
FIG. 2 is a diagramatic representation of a permeation tube and its associated manifold.

FIG. 2 schematically represents the construction of the Aliquot device 44. As indicated in this figure, a permeation tube 90, as disclosed in co-pending application 212,272, has its neck extend through an aperture formed in manifold 91. Flanges 92 extend outwardly from the neck and support the permeation tube 90 in the position illustrated. 94 indicates a cup shaped membranne which can be fabricated from FEP TEFLON (DuPont) that is held on the open end of the permeation tube neck by a retainer fastener 96. The preselected liquified source gas 100 fills a good portion of the permeation tube 90 and as vapors develop from the liquified gas 100, they fill the space 98 adjacent the membrane 94. The gas permeates through the membrane 94 and mixes with the introduced diluent which is the zero gas entering from coil 42. In effect, the resultant mixture of source gas and zero gas simulates an artificial atmosphere having the source gas as a pollutant.

Figure 3:
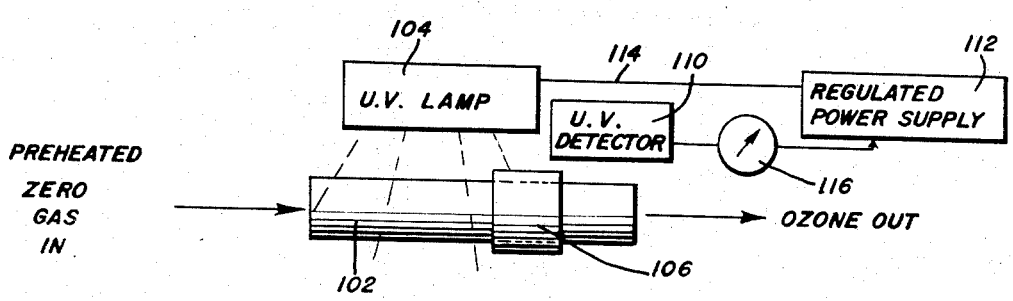
FIG. 3 is a block diagram depicting an ozone generator for use in the calibration system.

FIG. 3 illustrates in schematic form an assembly for generating ozone. The assembly includes a quartz tube 102 that is axially hollow. This quartz tube is physically positioned in lieu of the manifold 91 of FIG. 2. Therefore, the tube 102 admits pre-heated zero gas at a precisely controlled temperature and at a constant humidity.

An ultraviolet lamp 104 generates radiation that passes through the quartz tube 102. Ozone is generated within the tube due to the reaction of oxygen with ultraviolet light. The generated ozone is delivered from the outlet end of the tube 102 which would be equivalent to the outlet port 48 of the Aliquot device 44 of FIG. 1.

In order to assure constant concentration of ozone after long periods of lamp operation, it is necessary to provide the ultraviolet lamp 104 with a highly regulated power supply 112. The ozone concentration can be varied by positioning a sliding shroud 106 along the tube length thereby varying the degree of ultraviolet transmission through the tube. However, this would require manual manipulation within the system. Therefore, it is preferable to have an electronically controlled regulated power supply 112.

The output 114 of the supply 112 is connected to the lamp 104. However, in order to assure accurate regulation, an ultraviolet detector 110 must be located adjacent the ultraviolet lamp 104 so that the ultraviolet radiation can be detected. The output of the detector 110 is connected to the input of the regulated power supply 112 through a feedback control 116, which could be a rheostat for controlling the feedback gain. This control would allow precise variation of ozone flow through the tube 102.

For particulars, conditioner 16 includes two components. The first component is an oxidizer such as chromium trioxide impregnated Pearlite (W.R. Grace) which is dried in an oven having an inert atmosphere. Thereafter, this material is packed in a tube. The second component is a moisture regulating material, such as soda lime, well known in the art.

The two components may be packed into a single tube as illustrated at 16, or they may be packed into separate tubes, serially connected. Other means for oxidizing the air may be used as well.

In view of the above described system, it will be appreciated that an invention is being offered which has improvements and advantages not hereinbefore offered by the prior art. Flexibility, portability and ruggedness enable utilization of the present invention with a wide variety of gas analyzers used to monitor, among other things, air pollution.

It should be understood that the invention is not limited to the exact details of construction shown and described herein for obvious modifications will occur to persons skilled in the art.

Wherefore, the following is claimed:

1. In a system for mixing a source gas with purified ambient air to form a source gas mixture of predictable concentration, a humidity regulated ambient air purifier comprising:
   inlet means for introducing ambient air into the system;
   conditioning means communicating with the inlet means for oxidizing the ambient air and regulating moisture in the oxidized ambient air to maintain constant humidity thereof; and
   filter means communicating with the conditioning means for removing pollutants from the oxidized air to form zero gas.

2. The system as set forth in claim 1 wherein the source gas is formed by source gas generating means.

3. The system set forth in claim 2 together with manifold means communicating with both the filter means and the generating means to combine the source gas and the zero gas.

4. The system set forth in claim 3 together with means surrounding the generating means for maintaining the generating means at a constant temperature.

5. The structural subject matter recited in claim 4 together with means disposed between the filter means and the manifold means for preheating the zero gas to a temperature equal to that of the generating means thereby preventing a temperature change of the generating means due to the zero gas.

6. The system as defined in claim 2 wherein the generating means is a permeation tube.

7. The system as set forth in claim 2 wherein the generating means is an ozone generator.

8. The subject matter as recited in claim 5, wherein a plurality of conduits are provided for mixing the zero gas with different respective source gases;
   means for selectively delivering the zero gas to the plurality of conduits;
   switching valve means connected at an outlet end portion of each conduit to receive the source gas diluted with zero gas;
   means for conducting only zero gas to each valve means; and
   control means for selecting whether each switching valve means passes the diluted gas or the zero gas to a gas analyzer for the calibration thereof.

9. The structure recited in claim 8 wherein the switching valve means have individual switching controls for actuating each valve to a selected switching state.

10. The structure recited in claim 9 together with a programmable timer for automatically actuating the valves between states at preselected intervals.

11. The subject matter as defined in claim 10 together with means for remote control initiation of the timer, the timer further furnishing status data thereof to the remote control means.

* * * * *